US 10,454,125 B2

(12) United States Patent  
Naito (10) Patent No.: US 10,454,125 B2  
(45) Date of Patent: Oct. 22, 2019

(54) VEHICLE FUEL CELL STACK

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 237 days.

(21) Appl. No.: 15/417,219

(22) Filed: Jan. 27, 2017

(65) Prior Publication Data

US 2017/0222250 A1  Aug. 3, 2017

(30) Foreign Application Priority Data

Jan. 29, 2016 (JP) .................. 2016-016121

(51) Int. Cl.
*H01M 8/2475* (2016.01)
*B60L 50/71* (2019.01)

(52) U.S. Cl.
CPC .......... *H01M 8/2475* (2013.01); *B60L 50/71* (2019.02); *H01M 2250/20* (2013.01); *Y02T 90/32* (2013.01)

(58) Field of Classification Search
CPC .................................................. H01M 8/2475
See application file for complete search history.

(56) References Cited

U.S. PATENT DOCUMENTS

2010/0183949 A1* 7/2010 Niimi .................. H01M 8/247  
429/508

FOREIGN PATENT DOCUMENTS

JP         2006-221854         8/2006

* cited by examiner

*Primary Examiner* — Jeremiah R Smith  
(74) *Attorney, Agent, or Firm* — Mori & Ward, LLP (57) ABSTRACT

A vehicle fuel cell stack includes a stacked body, a stack case, and a cover member. The stack case accommodating the stacked body therein. The stack case includes an upper wall, a lower wall, and a vent opening. The lower wall is opposite to and below the upper wall in a height direction of a vehicle. The lower wall includes an upper surface and a lower surface opposite to and below the upper surface in the height direction. The vent opening passes through the bottom wall in the height direction. The cover member is disposed on the lower surface of the bottom wall to cover the vent opening when viewed in the height direction and to have an opening between the cover member and the lower surface of the bottom wall when viewed along the lower surface.

5 Claims, 7 Drawing Sheets

VEHICLE FUEL CELL STACK

CROSS-REFERENCE TO RELATED APPLICATIONS

The present application claims priority under 35 U.S.C. § 119 to Japanese Patent Application No. 2016-016121, filed Jan. 29, 2016, entitled "Vehicle Fuel Cell Stack." The contents of this application are incorporated herein by reference in their entirety.

BACKGROUND

1. Field

The present disclosure relates to a vehicle fuel cell stack.

2. Description of the Related Art

For example, a solid polymer electrolyte fuel cell includes a membrane electrode assembly (MEA), in which an anode electrode is disposed on one surface of an electrolyte membrane, which is a polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked and mounted in a fuel cell vehicle as a vehicle fuel cell stack.

A vehicle fuel cell stack has a structure in which a stacked body, in which a predetermined number of power generation cells are stacked, is accommodated in a stack case. In this case, when the fuel cell stack is operated, the temperature of the inside of the stack case increases easily and condensation may occur. Therefore, it is necessary to remove condensate water from the inside of the stack case. For example, Japanese Unexamined Patent Application Publication No. 2006-221854 discloses a mobile fuel cell developed to address this need.

The mobile fuel cell includes a stack case including a lower case at the bottom of the stack case. Grooves for collecting condensate water are formed in an upper surface of the lower case. A recess (accumulator), which is deeper than the grooves, is formed in a central part of the lower case. A drain hole is formed at the center of the recess, and water that has flowed into the recess from the grooves is discharged through the drain hole to the outside of the stack case.

SUMMARY

According to one aspect of the present invention, a vehicle fuel cell stack includes a stacked body, a stack case, and a cover member. The stacked body includes a plurality of power generation cells that are stacked. Each of the power generation cells generates electric power by causing an electrochemical reaction between a fuel gas and an oxidant gas. The stack case accommodates the stacked body. The stack case includes a lower portion in which a vent opening is formed so as to open to the inside of the stack case. The cover member is disposed on the lower portion of the stack case. The cover member has a U-shape and includes a bottom portion at a bottom of the U-shape. The bottom portion is located vertically below the vent opening.

According to another aspect of the present invention, a vehicle fuel cell stack includes a stacked body, a stack case, and a cover member. The stacked body includes power generation cells. The power generation cells are stacked. Each of the power generation cells is configured to generate electric power via electrochemical reaction between a fuel gas and an oxidant gas. The stack case accommodating the stacked body therein. The stack case includes an upper wall, a lower wall, and a vent opening. The lower wall is opposite to and below the upper wall in a height direction of a vehicle. The lower wall includes an upper surface and a lower surface opposite to and below the upper surface in the height direction. The vent opening passes through the bottom wall in the height direction. The cover member is disposed on the lower surface of the bottom wall to cover the vent opening when viewed in the height direction and to have an opening between the cover member and the lower surface of the bottom wall when viewed along the lower surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
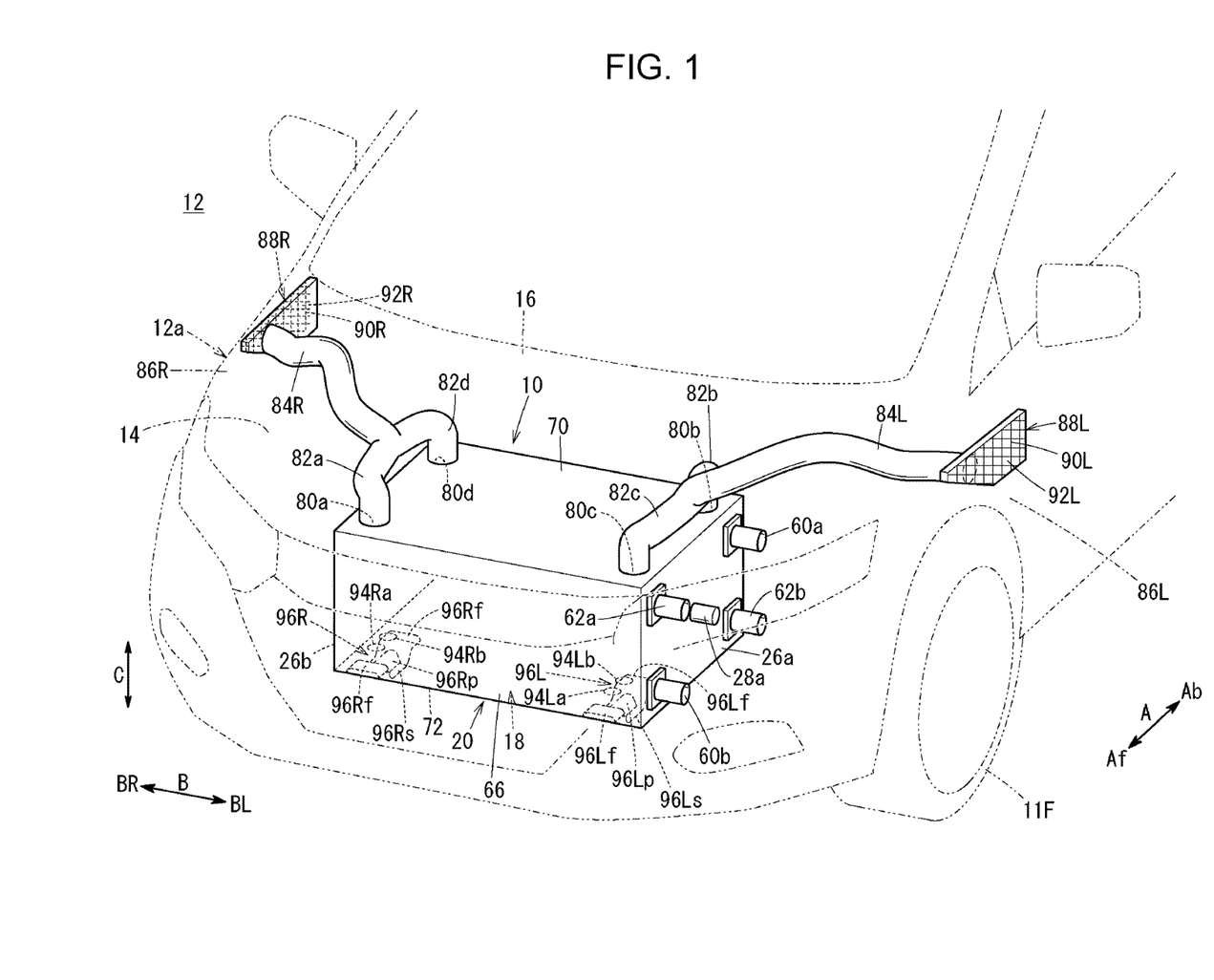
FIG. 1 is a schematic perspective view of a front portion of a fuel cell vehicle, in which a fuel cell stack according to a first embodiment of the present disclosure is mounted.
Figure 2:
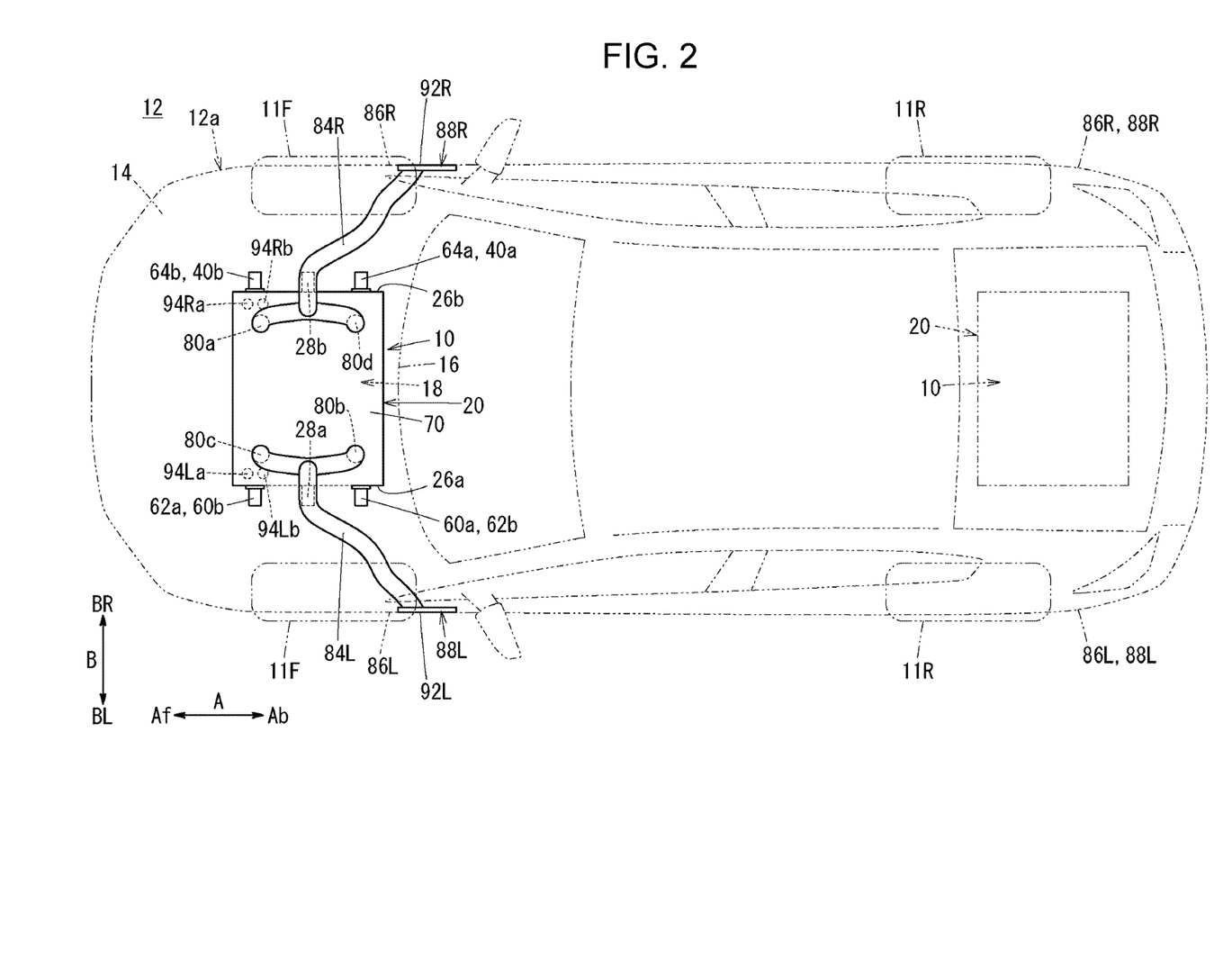
FIG. 2 is a schematic plan view of the fuel cell vehicle.

Referring to FIGS. 1 and 2, a fuel cell stack 10 according to a first embodiment of the present disclosure is mounted, for example, in a fuel cell vehicle 12, such as a fuel cell electric automobile. The fuel cell vehicle 12 includes a vehicle body 12*a* including front wheels 11F and rear wheels 11R (see FIG. 2).

In a part of the vehicle body 12*a* near the front wheels 11F, a front box (motor compartment) 14 is formed in front of a dashboard 16. The fuel cell stack 10 is disposed in the front box 14. The fuel cell stack 10 may be disposed, instead of in the front box 14, under the floor, on the trunk lid, or the like.

Figure 3:
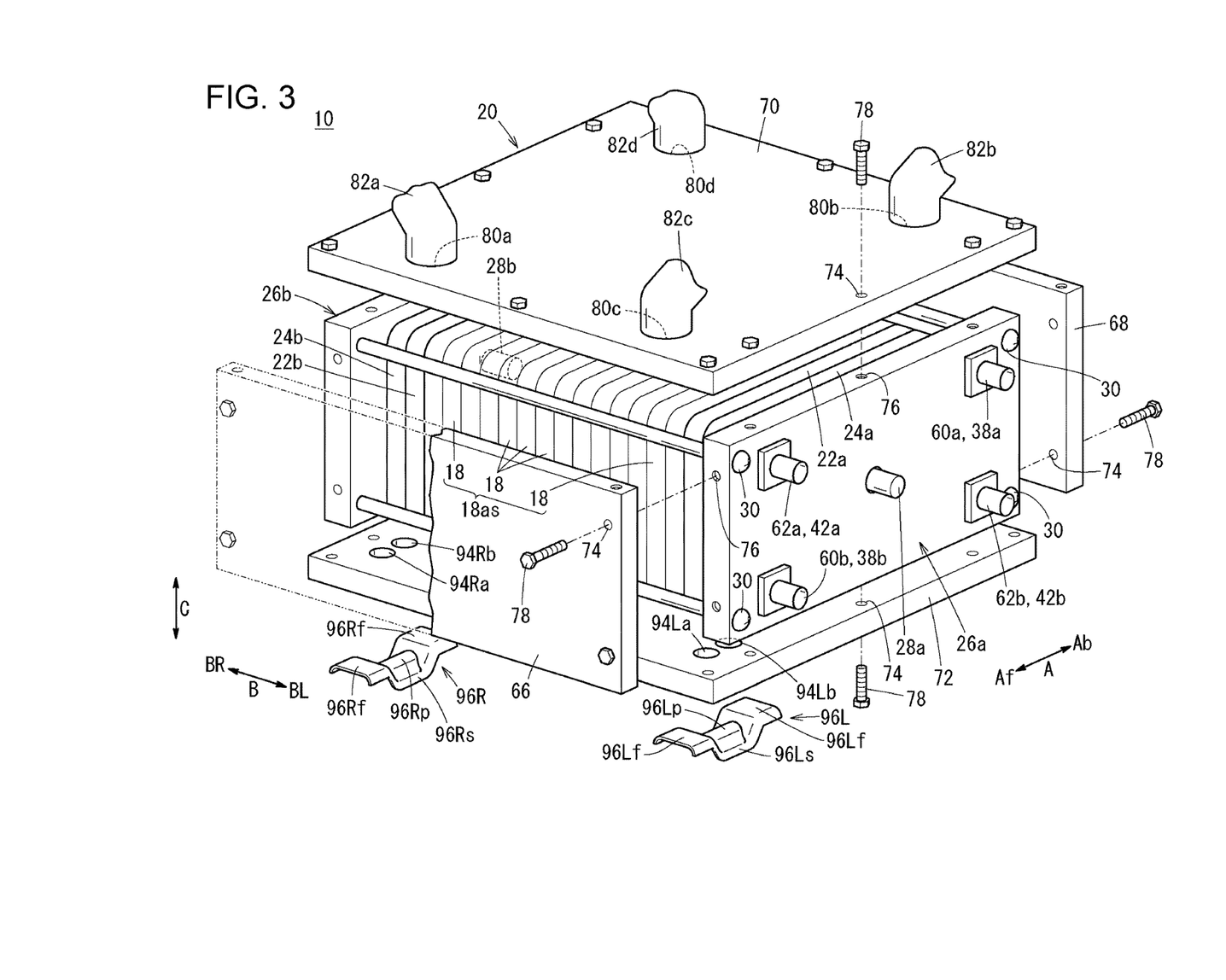
FIG. 3 is an exploded perspective view of the fuel cell stack.

Referring to FIG. 3, the fuel cell stack 10 includes a stacked body 18*as*, which includes a plurality of power generation cells 18 that are stacked, and a stack case 20, which accommodates the stacked body 18*as*. The plurality of power generation cells 18 are stacked in the vehicle-width direction (direction of arrow B) so that their power generation surfaces are in upright positions. At one end of the power generation cells 18 in the stacking direction, a first terminal plate 22a, a first insulation plate 24a, and a first end plate 26a are arranged outward.

At the other end of the power generation cells 18 in the stacking direction, a second terminal plate 22b, a second insulation plate 24b, and a second end plate 26b are arranged outward. The first end plate 26a and the second end plate 26b are disposed at both ends of the fuel cell stack 10 in the vehicle-width direction.

The first end plate 26a and the second end plate 26b each have outside dimensions greater than those of the power generation cell 18, the first insulation plate 24a, and the second insulation plate 24b. The first terminal plate 22a may be accommodated in a recess in the first insulation plate 24a, and the second terminal plate 22b may be accommodated in a recess in the second insulation plate 24b.

A first electric power output terminal 28a, which is connected to the first terminal plate 22a, extends outward from a central part (or from an off-center part) of the first end plate 26a, which has a horizontally elongated shape. A second electric power output terminal 28b, which is connected to the second terminal plate 22b, extends outward from a central part (or from an off-center part) of the second end plate 26b, which has a horizontally elongated shape.

Corner portions of the first end plate 26a and the second end plate 26b are fixed to each other by using tie rods 30, which extend in the stacking direction, and a fastening load is applied to the fuel cell stack 10 in the stacking direction. Instead of the tie rods 30, rectangular connection bars, which connect central parts of edge portions of the first end plate 26a and the second end plate 26b, may be used.

Figure 4:
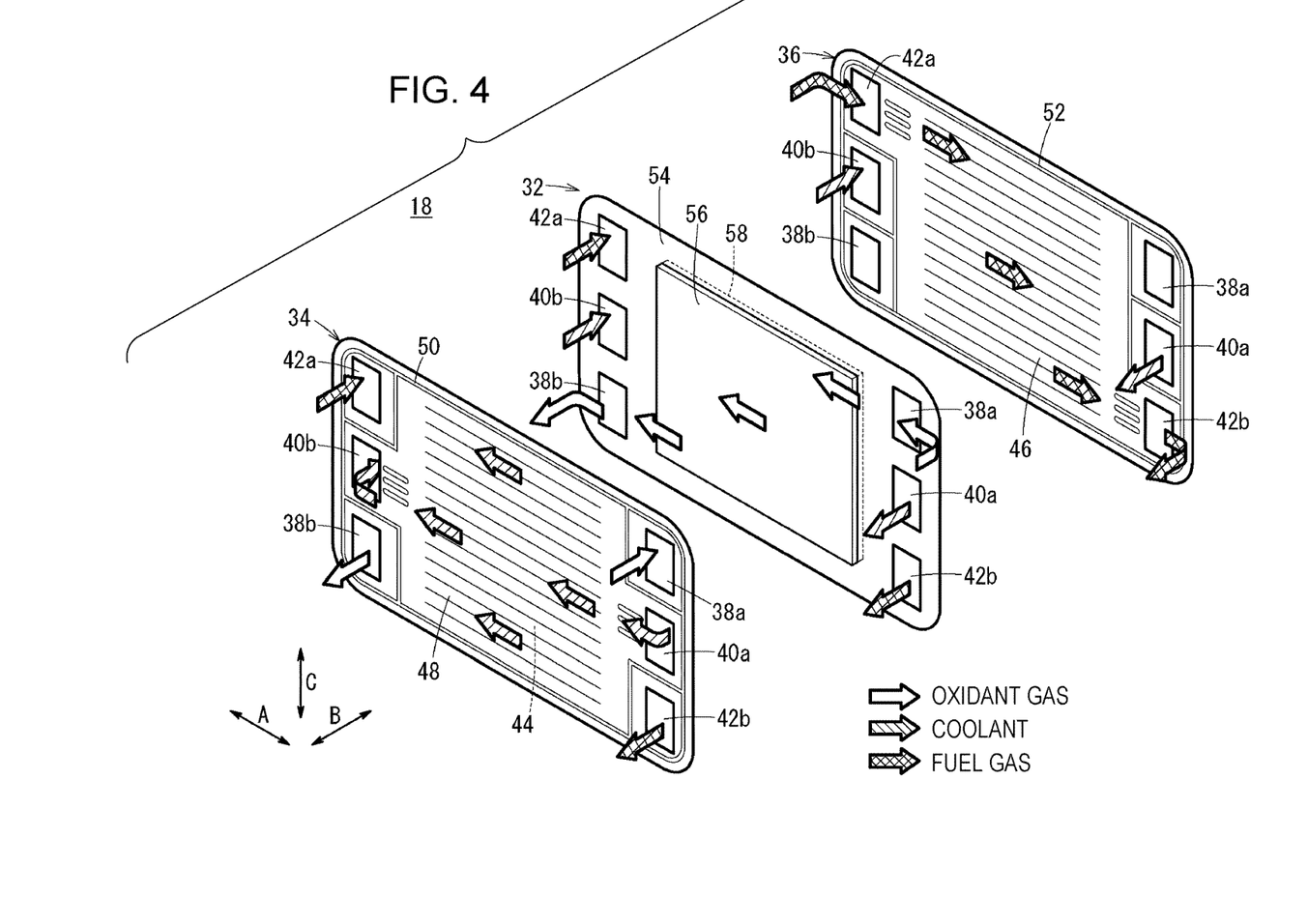
FIG. 4 is an exploded perspective view of a power generation cell of the fuel cell stack.

Referring to FIG. 4, in each power generation cell 18, a membrane electrode assembly 32 is sandwiched between a first separator 34 and a second separator 36. Preferably, the four corners of the power generation cell 18 each have a curved (rounded) shape. The first separator 34 and the second separator 36 are each a metal separator or a carbon separator.

An oxidant gas inlet manifold 38a, a coolant inlet manifold 40a, and a fuel gas outlet manifold 42b are each formed in the power generation cell 18 so as to individually extend in the stacking direction (the direction of arrow B) through one end portion of the power generation cell 18 in the direction of arrow A. The oxidant gas inlet manifold 38a, the coolant inlet manifold 40a, and the fuel gas outlet manifold 42b are arranged in the direction of arrow C (vertical direction). An oxidant gas, such as an oxygen-containing gas, is supplied through the oxidant gas inlet manifold 38a. A coolant is supplied through the coolant inlet manifold 40a. A fuel gas, such as a hydrogen-containing gas, is discharged through the fuel gas outlet manifold 42b.

A fuel gas inlet manifold 42a, a coolant outlet manifold 40b, and an oxidant gas outlet manifold 38b are each formed in the power generation cell 18 so as to individually extend in the direction of arrow B through the other end portion of the power generation cell 18 in the direction of arrow A. The fuel gas inlet manifold 42a, the coolant outlet manifold 40b, and the oxidant gas outlet manifold 38b are arranged in the direction of arrow C. The fuel gas is supplied through the fuel gas inlet manifold 42a, the coolant is discharged through the coolant outlet manifold 40b, and the oxidant gas is discharged through the oxidant gas outlet manifold 38b.

An oxidant gas channel 44, which is connected to the oxidant gas inlet manifold 38a and the oxidant gas outlet manifold 38b, is formed on a surface of the first separator 34 facing the membrane electrode assembly 32. The oxidant gas channel 44 includes a plurality of linear grooves (or wave-shaped grooves), through which the oxidant gas flows in the direction of arrow A.

A fuel gas channel 46, which is connected to the fuel gas inlet manifold 42a and the fuel gas outlet manifold 42b, is formed on a surface of the second separator 36 facing the membrane electrode assembly 32. The fuel gas channel 46 includes a plurality of linear grooves (or wave-shaped grooves), through which the fuel gas flows in the direction of arrow A.

A coolant channel 48, which is connected to the coolant inlet manifold 40a and the coolant outlet manifold 40b, is formed between the first separator 34 of the power generation cell 18 and the second separator 36 of an adjacent power generation cell 18. A sealing member 50 is integrally formed with or independently formed on the first separator 34. A sealing member 52 is integrally formed with or independently formed on the second separator 36.

The membrane electrode assembly 32 includes a solid polymer electrolyte membrane 54 (cation exchange membrane) and a cathode electrode 56 and an anode electrode 58, which sandwich the solid polymer electrolyte membrane 54. The solid polymer electrolyte membrane 54 is, for example, a thin film that is made of a perfluorosulfonic acid polymer including water. The cathode electrode 56 and the anode electrode 58 each include a gas diffusion layer and an electrode catalyst layer. The gas diffusion layer is made of carbon paper or the like. The electrode catalyst layer is formed by uniformly coating a surface of the first gas diffusion layer with porous carbon particles whose surfaces support a platinum alloy. The electrode catalyst layers are formed on both sides of the solid polymer electrolyte membrane 54.

Referring to FIG. 3, at one pair of opposite corners of the first end plate 26a, an oxidant gas supply manifold member 60a, which is connected to the oxidant gas inlet manifold 38a, and an oxidant gas discharge manifold member 60b, which is connected to the oxidant gas outlet manifold 38b, are disposed. At the other pair of opposite corners of the first end plate 26a, a fuel gas supply manifold member 62a, which is connected to the fuel gas inlet manifold 42a, and a fuel gas discharge manifold member 62b, which is connected to the fuel gas outlet manifold 42b, are disposed.

Referring to FIG. 2, on the second end plate 26b, a coolant supply manifold member 64a, which is connected to the coolant inlet manifold 40a, and a coolant discharge manifold member 64b, which is connected to the coolant outlet manifold 40b, are disposed.

Referring to FIG. 3, the fuel cell stack 10 includes the stack case 20, which accommodates the stacked body 18as and which has a quadrangular shape (for example, a rectangular shape) in plan view. The stack case 20 includes a front side panel 66, a back side panel 68, an upper panel 70, a lower panel 72, the first end plate 26a, and the second end plate 26b. Components of the stack case 20 are fixed to each other and to the first end plate 26a and the second end plate 26b by inserting screws 78 into holes 74 and by tightening the screws 78 into screw holes 76.

At one pair of opposite corners of the upper panel 70, openings 80a and 80b, through which the inside of the stack case 20 is connected to the outside, are formed. At the other pair of opposite corners of the upper panel 70, openings 80c and 80d, through which the inside of the stack case 20 is connected to the outside, are formed. The openings 80a and 80c are formed at both side portions of a front portion of the stack case 20 (in the direction of arrow Af) so as to be located above the fuel gas inlet manifold 42a in the vertical direction. The openings 80b and 80d are formed at both side portions of a back portion of the stack case 20 (in the direction of arrow Ab). Alternatively, for example, the openings 80b and 80d may be formed in the first end plate 26a and the second end plate 26b.

One end of each of vent ducts 82a to 82d is connected to a corresponding one of the openings 80a to 80d. Referring to FIGS. 1 and 2, the other end of the vent duct 82a and the other end of the vent duct 82d are joined to each other and connected to one end of a right exhaust duct 84R. The other end of the vent duct 82b and the other end of the vent duct 82c are joined to each other and connected to one end of a left exhaust duct 84L.

The right exhaust duct 84R opens to a right fender 86R of the vehicle body 12a of the fuel cell vehicle 12. The left exhaust duct 84L opens to a left fender 86L of the vehicle body 12a. An elastic hose may be connected to an intermediate portion of each of the right exhaust duct 84R and the left exhaust duct 84L. The right exhaust duct 84R and the left exhaust duct 84L may each have a flat shape extending in a horizontal direction.

A left exhaust member 88L and a right exhaust member 88R are respectively disposed on the left fender 86L and the right fender 86R at positions above and behind the front wheels 11F. The left exhaust member 88L and the right exhaust member 88R each have an inner space, and a mesh member 90L and a mesh member 90R are respectively disposed on the surfaces of the exhaust members 88L and 88R. The mesh members 90L and 90R form a left side exhaust opening 92L and a right side exhaust opening 92R. The left exhaust member 88L and the right exhaust member 88R may be perforated plates, having a plurality of holes that allow external air to pass through the mesh member 90L and the mesh member 90R.

Referring to FIG. 3, in the lower panel 72, which corresponds to a lower portion of the stack case 20, vent holes 94La and 94Lb (vent openings) (drain holes) and vent holes 94Ra and 94Rb (vent openings) (drain holes) are formed so as to be arranged in the front-back direction of the vehicle (the direction of arrow Af).

The vent holes 94La and 94Lb are disposed in a left part (in the direction of arrow BL) of a front end portion of the lower panel 72. The vent holes 94Ra and 94Rb are disposed in a right part (in the direction of arrow BR) of a front end portion of the lower panel 72. Instead of the two vent holes 94La and 94Lb, three or more vent holes may be formed. Instead of the two vent holes 94Ra and 94Rb, three or more vent holes may be formed. Vent holes may be formed in right and left parts (in the direction of arrow BR and arrow BL) of a back end portion of the lower panel 72 (in the direction of arrow Ab).

Figure 5:
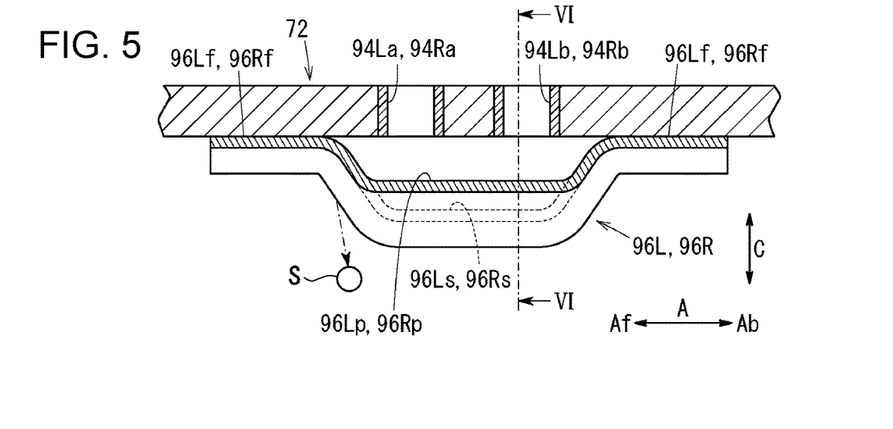
FIG. 5 is a sectional view of a lower panel of the fuel cell stack in a state in which a cover member is fixed to a bottom surface of the lower panel.

Referring to FIGS. 3 and 5, cover members 96L and 96R are fixed to a bottom surface of the lower panel 72 by welding, by using screws, by brazing, or the like. The cover member 96L extends in the front-back direction (direction of arrow A) of the fuel cell vehicle 12 and has a U-shape when seen in the vehicle-width direction (direction of arrow B).

Figure 7:
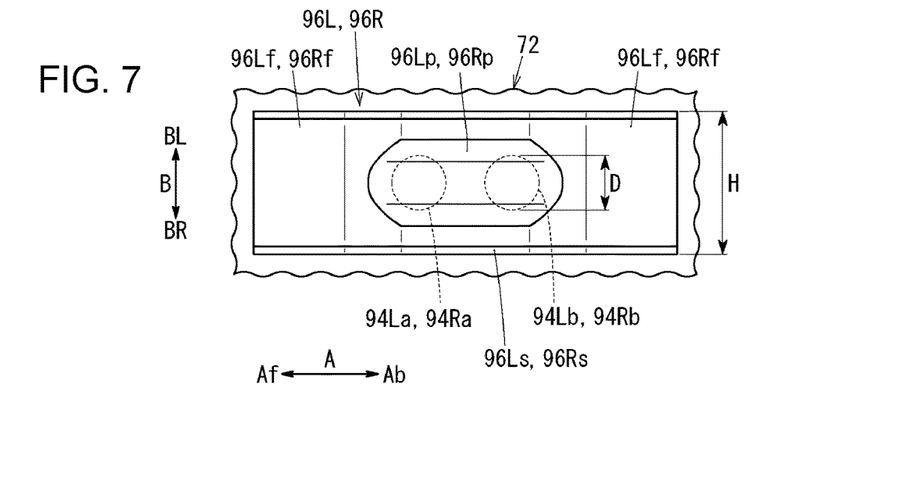
FIG. 7 is a bottom view of the lower panel.

Referring to FIG. 7, the cover member 96L includes a bottom portion 96Ls at the bottom of the U-shape, and the bottom portion 96Ls is located vertically below the vent holes 94La and 94Lb. Referring to FIGS. 3, 5, and 7, the cover member 96L includes a pair of flat portions 96Lf at front and back ends of the bottom portion 96Ls. The pair of flat portions 96Lf are fixed to the bottom surface of the lower panel 72.

Figure 6:
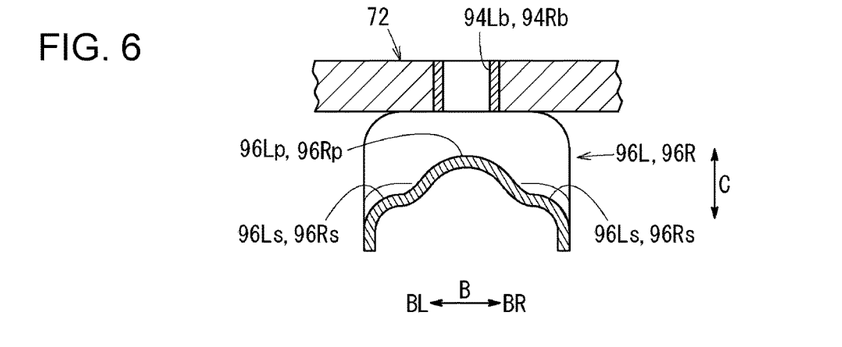
FIG. 6 is a sectional view of the lower panel and the cover member, taken along line VI-VI in FIG. 5.

The bottom portion 96Ls of the cover member 96L includes a protruding portion 96Lp that protrudes upward. The protruding portion 96Lp extends in the front-back direction of the vehicle. Referring to FIG. 6, dust or water does not collect in the protruding portion 96Lp, because the protruding portion 96Lp is disposed directly below the vent holes 94La and 94Lb and is inclined downward without having any flat portion.

Referring to FIG. 7, when the cover member 96L is seen from below, the diameters D of the vent holes 94La and 94Lb are located within the width H (the dimension in the direction of arrow B) of the bottom portion 96Ls (D<H). A gap is formed between the protruding portion 96Lp and the vent holes 94La and 94Lb. The cover member 96L is reinforced by forming ribs by bending both ends of the cover member 96L in the width direction (direction of arrow B).

Referring to FIGS. 3 and 5, the cover member 96R extends in the front-back direction (direction of arrow A) of the fuel cell vehicle 12 and has a U-shape when seen in the vehicle-width direction (direction of arrow B). The cover member 96R includes a bottom portion 96Rs at the bottom of the U-shape, and the bottom portion 96Ls is located vertically below the vent holes 94Ra and 94Rb. The cover member 96L includes a pair of flat portions 96Rf at front and back ends of the bottom portion 96Rs. The pair of flat portions 96Rf are fixed to the bottom surface of the lower panel 72.

The bottom portion 96Rs of the cover member 96R includes a protruding portion 96Rp that protrudes upward. The protruding portion 96Rp extends in the front-back direction of the vehicle. Referring to FIG. 6, dust or water does not collect in the protruding portion 96Rp, because the protruding portion 96Rp is disposed directly below the vent holes 94Ra and 94Rb and is inclined downward without having any flat portion.

Referring to FIG. 7, when the cover member 96R is seen from below, the diameters D of the vent holes 94Ra and 94Rb are located within the width H of the bottom portion 96Rs (D<H). A gap is formed between the protruding portion 96Rp and the vent holes 94Ra and 94Rb. The cover member 96R is reinforced by forming ribs by bending both ends of the cover member 96R in the width direction (direction of arrow B).

The fuel cell stack 10 is fixed to a vehicle frame by using mount members (not shown) attached to the first end plate 26a and the second end plate 26b.

An operation of the fuel cell stack 10, which is structured as described above, will be described below in relation to the fuel cell vehicle 12.

Referring to FIG. 3, when the fuel cell vehicle 12 is driven, a fuel gas is supplied from the fuel gas supply manifold member 62a of the first end plate 26a to the fuel gas inlet manifold 42a. An oxidant gas is supplied from the oxidant gas supply manifold member 60a of the first end plate 26a to the oxidant gas inlet manifold 38a.

Referring to FIG. 4, the fuel gas flows from the fuel gas inlet manifold 42a into the fuel gas channel 46 of the second separator 36. The fuel gas is supplied to the anode electrode 58 of the membrane electrode assembly 32 while flowing in the direction of arrow A.

The oxidant gas flows from the oxidant gas inlet manifold 38a into the oxidant gas channel 44 of the first separator 34. The oxidant gas is supplied to the cathode electrode 56 of the membrane electrode assembly 32 while flowing in the direction of arrow A (in a direction opposite to the flow of the fuel gas).

Accordingly, in the membrane electrode assembly 32, the fuel gas supplied to the anode electrode 58 and the oxidant gas supplied to the cathode electrode 56 cause electrochemical reactions in the electrode catalyst layers, and thereby electric power is generated.

Referring to FIG. 3, the fuel gas is discharged from the fuel gas outlet manifold 42b to the fuel gas discharge manifold member 62b of the first end plate 26a. The oxidant gas is discharged from the oxidant gas outlet manifold 38b to the oxidant gas discharge manifold member 60b of the first end plate 26a.

Referring to FIG. 2, a coolant is supplied from the coolant supply manifold member 64a of the second end plate 26b to the coolant inlet manifold 40a. Referring to FIG. 4, the coolant flows into the coolant channel 48 between the first separator 34 and the second separator 36. After cooling the membrane electrode assembly 32, the coolant flows through the coolant outlet manifold 40b and is discharged to the coolant discharge manifold member 64b.

In the first embodiment, referring to FIGS. 3 and 5, the cover member 96L, which extends in the front-back direction of the vehicle and has a U-shape, is disposed on the bottom surface of the lower panel 72. The bottom portion 96Ls of the cover member 96L is located vertically below the vent holes 94La and 94Lb.

Accordingly, referring to FIG. 5, when the fuel cell vehicle 12 is being driven, even if a foreign substance S, which may be water, dust, or a small fuel, is ejected toward a lower part of the fuel cell stack 10, the foreign substance S collides with the cover member 96L. Thus, it is possible to reliably prevent the foreign substance S from entering the vent holes 94La and 94Lb.

Therefore, by simply attaching the cover member 96L to the stack case 20, it is possible to reduce the probability that the vent holes 94La and 94Lb, which are formed in a lower portion (the lower panel 72) of the stack case 20, become blocked. Moreover, if the fuel cell stack 10 is directly placed on a placement surface, the vent holes 94La and 94Lb can be prevented from being damaged.

Moreover, referring to FIG. 3, the bottom portion 96Ls of the cover member 96L includes the protruding portion 96Lp that protrudes upward. Accordingly, the foreign substance S does not remain on a surface (upper surface) of the cover member 96L opposite to the bottom portion 96Ls but is deflected along the shape of the protruding portion 96Lp, and the vent holes 94La and 94Lb can be reliably prevented from being blocked.

Furthermore, referring to FIG. 7, when the cover member 96L is seen from below, the diameters D of the vent holes 94La and 94Lb are located within the width H of the bottom portion 96Ls (D<H). Thus, the entirety of the cover member 96L can be reduced in size, and the vent holes 94La and 94Lb can be reliably protected from the foreign substance S that is ejected.

The cover member 96R, which extends in the front-back direction of the vehicle and has a U-shape, is disposed on the bottom surface of the lower panel 72. The cover member 96R provides the same advantages as the cover member 96L.

Figure 8:
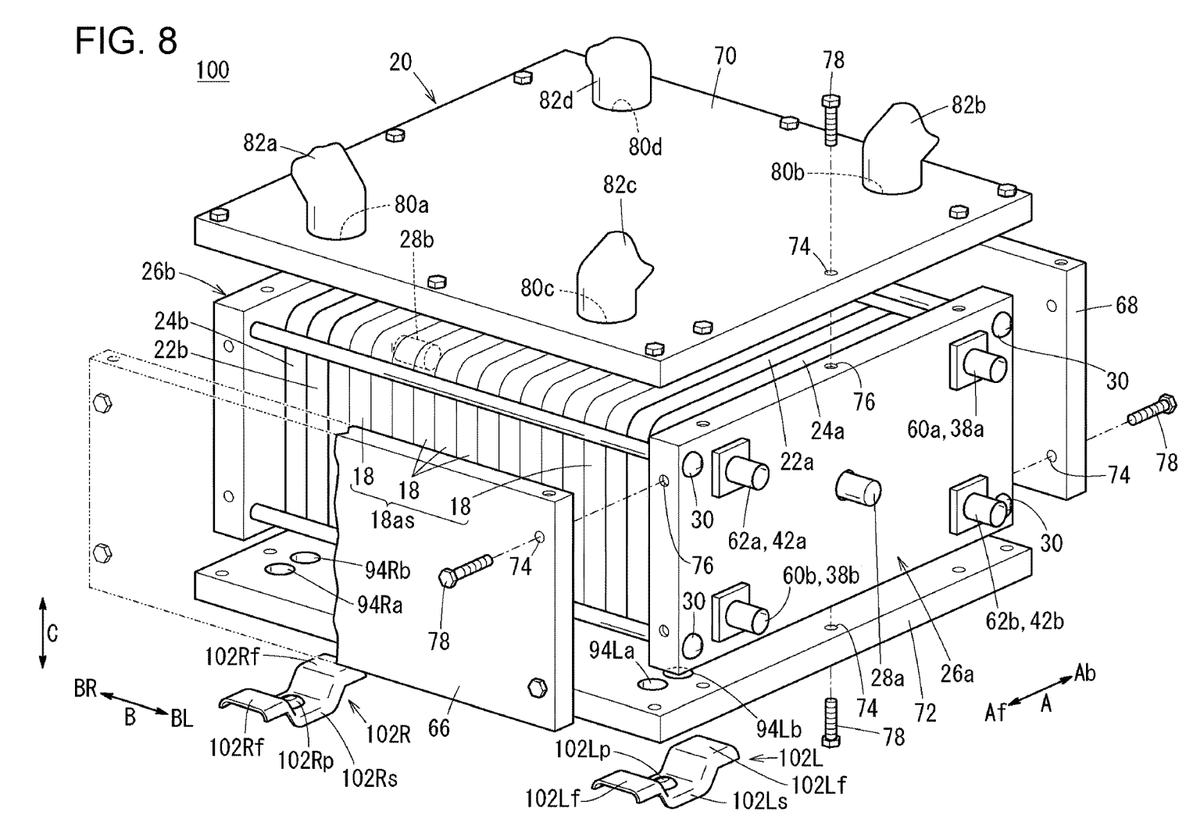
FIG. 8 is an exploded perspective view of a fuel cell stack according to a second embodiment of the present disclosure.

FIG. 8 is an exploded perspective view of a fuel cell stack 100 according to a second embodiment of the present disclosure. Elements of the fuel cell stack 100 that are the same as those of the fuel cell stack 10 according to the first embodiment will be denoted by the same numerals and detailed descriptions of such elements will be omitted.

The fuel cell stack 100 includes, instead of the cover members 96L and 96R, cover members 102L and 102R, which are fixed to the bottom surface of the lower panel 72 of the stack case 20.

Figure 9:
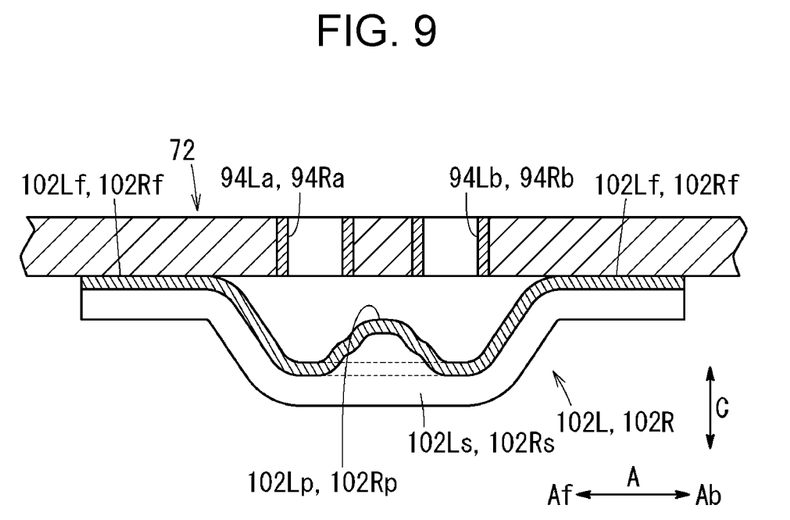
FIG. 9 is a sectional view of a lower panel of the fuel cell stack in a state in which a cover member is fixed to a bottom surface of the lower panel.

The cover member 102L extends in the front-back direction (direction of arrow A) of the fuel cell vehicle 12 and has a U-shape when seen in the vehicle-width direction (direction of arrow B). The cover member 102L includes a bottom portion 102Ls at the bottom of the U-shape, and the bottom portion 102Ls is located vertically below the vent holes 94La and 94Lb. The cover member 102L includes a pair of flat portions 102Lf that are located at front and back ends of the bottom portion 102Ls. The pair of flat portions 102Lf are fixed to the bottom surface of the lower panel 72.

The bottom portion 102Ls of the cover member 102L includes a protruding portion 102Lp that protrudes upward. The protruding portion 102Lp is disposed between an adjacent pair of the vent holes 94La and 94Lb.

The cover member 102R has the same structure as the cover member 102L. Therefore, detailed descriptions of portions of the cover member 102R, which are represented by numerals with a symbol "R" instead of "L", will be omitted.

In the second embodiment, the protruding portion 102Lp is disposed between an adjacent pair of the vent holes 94La and 94Lb. Therefore, for example, even if the cover member 102L becomes damaged, the protruding portion 102Lp collapses at a position between the vent holes 94La and 94Lb and contacts the bottom surface of the lower panel 72 while leaving a gap between the cover member 102L and the bottom surface. As a result, the cover member 102L does not block the vent holes 94La and 94Lb.

Accordingly, the second embodiment provides the same advantages as the first embodiment. Moreover, in particular, the second embodiment provides an advantage in that the shape of the vent holes 94La and 94Lb can be maintained further stably. The cover member 102R provides the same advantages as the cover member 102L.

According to the present disclosure, a vehicle fuel cell stack includes a stacked body including a plurality of power generation cells that are stacked, each of the power generation cells generating electric power by causing an electrochemical reaction between a fuel gas and an oxidant gas; and a stack case that accommodates the stacked body, the stack case including a lower portion in which a vent opening is formed so as to open to the inside of the stack case.

The vehicle fuel cell stack includes a cover member that is disposed on the lower portion of the stack case. The cover member has a U-shape and includes a bottom portion at a bottom of the U-shape, and the bottom portion is located vertically below the vent opening.

Preferably, in the vehicle fuel cell stack, the cover member extends in a front-back direction of a vehicle and has the U-shape when seen in a width direction of the vehicle.

Preferably, in the vehicle fuel cell stack, the bottom portion of the cover member includes a protruding portion that protrudes upward.

Preferably, in the vehicle fuel cell stack, when the cover member is seen from below, the vent opening is located within a width of the bottom portion.

Preferably, in the vehicle fuel cell stack, a plurality of the vent openings are formed so as to be arranged in a front-back direction of a vehicle, and the protruding portion of the bottom portion is disposed between an adjacent pair of the vent openings.

With the present disclosure, the cover member, which has a U-shape, is disposed on the lower portion of the stack case, and the bottom portion of the cover member is located vertically below the vent opening. Accordingly, when the fuel cell vehicle is being driven, even if a foreign substance, which may be water, dust, or a small fuel, is ejected toward a lower part of the fuel cell stack, the foreign substance collides with the cover member. Thus, it is possible to reliably prevent the foreign substance from entering the vent opening.

Therefore, with a simple structure, it is possible to reduce the probability that the vent opening, which is formed in a lower portion of the stack case, becomes blocked. Moreover, when the fuel cell stack is directly placed on a placement surface, the vent opening can be prevented from being damaged.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle fuel cell stack comprising:
   a stacked body that includes a plurality of power generation cells that are stacked, each of the power generation cells generating electric power by causing an electrochemical reaction between a fuel gas and an oxidant gas;
   a stack case that accommodates the stacked body, the stack case including a lower portion in which a vent opening is formed so as to open to the inside of the stack case; and
   a cover member that is disposed on the lower portion of the stack case,
   wherein the cover member includes a bottom portion, a first side portion extending from a first end of the bottom portion toward the stack case, and a second side portion extending from a second end of the bottom portion toward the stack case, and the bottom portion is located vertically below the vent opening, and
   wherein the cover member has an open side area adjacent to the bottom portion.

2. The vehicle fuel cell stack according to claim 1,
   wherein the cover member extends in a front-back direction of a vehicle, and
   wherein the first side portion, the bottom portion, and the second side portion form a U-shape when seen in a width direction of the vehicle.

3. The vehicle fuel cell stack according to claim 1,
   wherein the bottom portion of the cover member includes a protruding portion that protrudes upward.

4. The vehicle fuel cell stack according to claim 1,
   wherein, when the cover member is seen from below, the vent opening is located within a width of the bottom portion.

5. A vehicle fuel cell stack comprising:
   a stacked body that includes a plurality of power generation cells that are stacked, each of the power generation cells generating electric power by causing an electrochemical reaction between a fuel gas and an oxidant gas;
   a stack case that accommodates the stacked body, the stack case including a lower portion in which a vent opening is formed so as to open to the inside of the stack case; and
   a cover member that is disposed on the lower portion of the stack case,
   wherein the cover member includes a bottom portion, a first side portion extending from a first end of the bottom portion toward the stack case, and a second side portion extending from a second end of the bottom portion toward the stack case, and the bottom portion is located vertically below the vent opening,
   wherein the bottom portion of the cover member includes a protruding portion that protrudes upward,
   wherein a plurality of the vent openings are formed so as to be arranged in a front-back direction of a vehicle, and
   wherein the protruding portion of the bottom portion is disposed between an adjacent pair of the vent openings.

* * * * *